United States Patent
Blase

(10) Patent No.: US 6,554,219 B2
(45) Date of Patent: Apr. 29, 2003

(54) TRANSPORT DEVICE

(75) Inventor: Günter Blase, Bergisch Gladbach (DE)

(73) Assignee: Igus Spitzgussteille Für die Industrie GmbH, Köln (DE)

( * ) Notice: Subject to any disclaimer, the term of this patent is extended or adjusted under 35 U.S.C. 154(b) by 0 days.

(21) Appl. No.: 09/978,648

(22) Filed: Oct. 17, 2001

(65) Prior Publication Data

US 2002/0060262 A1 May 23, 2002

Related U.S. Application Data

(63) Continuation of application No. PCT/DE00/01147, filed on Apr. 13, 2000.

(30) Foreign Application Priority Data

Apr. 19, 1999 (DE) .................................. 299 07 445 U

(51) Int. Cl.$^7$ ......................... B65H 75/14; B65H 75/38
(52) U.S. Cl. ............................. 242/388.6; 242/603
(58) Field of Search ......................... 242/388.6, 406, 242/603, 167, 118.41; 191/12.2 R

(56) References Cited

U.S. PATENT DOCUMENTS

| | | | | |
|---|---|---|---|---|
| 1,621,714 A | * | 3/1927 | Dyer et al. .................. 242/603 |
| 1,909,277 A | * | 5/1933 | Jamar .................... 242/118.41 |
| 2,219,201 A | * | 10/1940 | Smith .................... 191/12.2 R |
| 3,130,929 A | * | 4/1964 | Shiels et al. ................ 242/167 |
| 3,539,123 A | * | 11/1970 | Shutt ....................... 242/388.6 |
| 3,545,693 A | * | 12/1970 | Gurner et al. ........... 242/388.6 |
| 3,837,590 A | | 9/1974 | Pollak |
| 3,854,017 A | * | 12/1974 | Crim ..................... 191/12.2 R |
| 4,345,724 A | | 8/1982 | Lindell |
| 4,667,896 A | * | 5/1987 | Frey et al. ............. 242/118.41 |
| 5,113,976 A | | 5/1992 | Noakes ........................ 188/32 |
| 5,145,390 A | * | 9/1992 | Kaul ....................... 242/388.6 |
| 5,215,279 A | | 6/1993 | Foit |
| 5,279,469 A | | 1/1994 | Foit |
| 5,441,215 A | * | 8/1995 | Nagayama et al. ......... 242/603 |
| 5,671,811 A | * | 9/1997 | Head ....................... 242/388.6 |
| 6,113,023 A | * | 9/2000 | Ueffing et al. ........... 242/388.6 |

FOREIGN PATENT DOCUMENTS

| | | |
|---|---|---|
| DE | 538 468 | 10/1931 |
| DE | 1 208 146 | 12/1965 |
| DE | 1449 666 | 12/1968 |
| DE | 77 29 407 | 1/1978 |
| DE | 91 12 515.4 U1 | 4/1992 |
| DE | 41 19 211 C1 | 12/1992 |
| DE | 195 36 722 A1 | 9/1995 |
| DE | 44 26 598 C1 | 12/1995 |
| EP | 0 699 616 A2 | 3/1996 |
| EP | 0 791 552 A1 | 8/1997 |
| JP | 4-209172 * | 4/1992 .............. 242/388.6 |

* cited by examiner

Primary Examiner—John M. Jillions
(74) Attorney, Agent, or Firm—Akin, Gump, Strauss, Hauer & Feld, L.L.P.

(57) ABSTRACT

A transporting device is essentially configured in the form of a cable reel and which is provided for an energy guide chain preferably equipped with cables. In order to simplify the handling and transport of the chain, the transporting device includes: a central body (3) which is preferably cylindrical and essentially arranged around a rotational axis of the transport device; terminal limiting elements (4,5) which are arranged in the vicinity of the end faces of the central body and which radially extend from the same, and divider(s) (6–9) for subdividing the space located between the terminal limiting elements into at least two sections.

8 Claims, 5 Drawing Sheets

TRANSPORT DEVICE

CROSS-REFERENCE TO RELATED APPLICATION

This application is a continuation of International Application No. PCT/DE00/01147, filed Apr. 13, 2000, the disclosure of which is incorporated herein by reference.

BACKGROUND OF THE INVENTION

The invention relates to a transport device essentially having the form of a cable drum on which an energy guiding chain is wound up fitted with cables or other lines, with a preferably cylindrical central core essentially mounted about a rotational axis of the transport device and with end elements located on the face ends of the central core and extending radially from it.

Such transport device is for example well known from EP 0 699 616.

The chains to be transported can already be completely equipped with cables, plugs, end mounts and strain relievers, so that they need only be connected. Energy guiding chains of this kind can be extremely long, very heavy and thus difficult to handle. In particular, depositing a long chain in a guide trough on the floor or on a crane jib at a height of about 10 to 20 m can only be achieved with great difficulty when it comes to large energy guiding chains with a width of 10 to 30 cm, as a chain of this kind can be up to 100 m long.

BRIEF SUMMARY OF THE INVENTION

The object of the invention is to simplify the handling and transport of energy guiding chains.

According to the invention, the object is solved in that means are provided for dividing the space between the end elements into at least a first section in which the cables protruding from an end of the energy guiding chain (2) are wound up, and a second section in which the energy guiding chain as such (28, 31) is wound up.

The central core is preferably designed as a cylindrical hollow body, in order to ensure easy winding and substantially prevent the occurrence of a polygon effect. The system chain can be wound up in the space between the two end elements by rotating the central core. The space between the end elements can be wide or narrow, as required. For example, the inside width of the drum can roughly correspond to the chain width, thus resulting in radial winding, but also in a drum with small longitudinal dimensions. This version is referred to as the radial configuration. Alternatively, the inside width of the drum can be many times greater than the width of the chain. In this design, the chain can be wound in one layer or several layers. Compared to the first configuration, this results in a wider drum which, however, has small radial dimensions. This second version is referred to below as the axial configuration.

The scope of the invention also encompasses the fact that the end elements are mounted on the central core in adjustable fashion, in order to be able to use the transport device to meet the needs of chain systems and chains of different widths.

The central core need not necessarily be a closed body, but can also consist of several adjacent bars or webs.

The end elements are preferably designed as circular end disks, as this enables particularly simple unwinding of the chain systems from the transport device. The transport device can then simply be rolled in order to wind or unwind the system chain. In order to improve handling of the transport device, handles are provided on the outside of the mounted end disks to help users wind and unwind the transport device.

It often happens that system chains of this kind have cables protruding from the ends of the actual energy guiding chain. These cables must also be wound up on the transport device. In this context, it must be ensured, particularly when starting to wind, that no sharp transitions form that could lead to kinking of the protruding cables and thus damage them. For this reason, dividers are arranged in the space between the end elements or end disks. These dividers ensure that the energy guiding chain and the ends can be wound up in defined areas formed by the dividers.

There are essentially two different types of division. In the axial configuration, division is achieved by circular divider disks, between which connecting struts are mounted. The divider disks and struts extend radially away from the central core, in order to divide the space provided between the end disks into disk-shaped sections (as seen from the side), in which the cables and the energy guiding chain can be wound up in a defined manner.

As an alternative to the divider disks, struts mounted on the central core can be provided, which extend radially away from the central core. Connecting struts are then fitted between these struts and/or the end disks and are preferably co-linear to the rotational axis of the transport device when mounted. Energy guiding chains or cables can be wound up on these connecting struts. The connecting struts are mounted on the radial struts in adjustable fashion, in order to allow the transport device to be adapted to different applications.

In the radial configuration, the energy guiding chain or the cable is first wound up on the central core. In order to form a second section, connecting struts or connecting elements are inserted between the radial struts that are again essentially co-linear to the rotational axis of the transport device. The energy guiding chain is then further wound on the connecting struts. In the radial configuration, sections spaced apart from one another in the radial direction are thus formed when winding up the energy guiding chain by inserting the connecting struts. Additional, radially spaced sections can be created as needed by inserting additional connecting struts.

In order to ensure accurate fixing of the energy guiding chain and prevent damage to the end mounting elements, it is advantageous to provide a fastening device on the transport device for the energy guiding chain or the end mounting element. As a rule, this fastening device is mounted on the central core or on the end elements.

The transport device can be provided with a shaft running coaxially to the rotational axis through the central core. The shaft can be designed to be permanent or removable. For transport, the transport device can be lifted by the ends of the shaft protruding from the sides of the transport device. This is achieved, for example, by chains which run around the shaft and can be lifted by a crane. In order to prevent the transport device from rotating during lifting, brakes that can be applied to the shaft are provided between the chains or the rope.

The shaft need not be of continuous design. It is also possible to mount cylindrical bars made of solid material on the outside of the end disks. In addition to the actual transport device, a fixing device for preventing the rotation of the transport device described above is also proposed in accordance with the invention. This fixing device is provided with a base, which can be set on a substructure and has beams with arc-shaped recesses suitable for accommodating the end disks. The radius of the arc-shaped recesses essentially corresponds to the radius of the end disks, so that the transport device is prevented from rolling away by the fixing device. Instead of the beams with arc-shaped recesses, simple wedges can also be inserted between the end disks and the base.

In order to achieve better locking, the fixing device can further be provided with a flange, which is bolted to the transport device.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
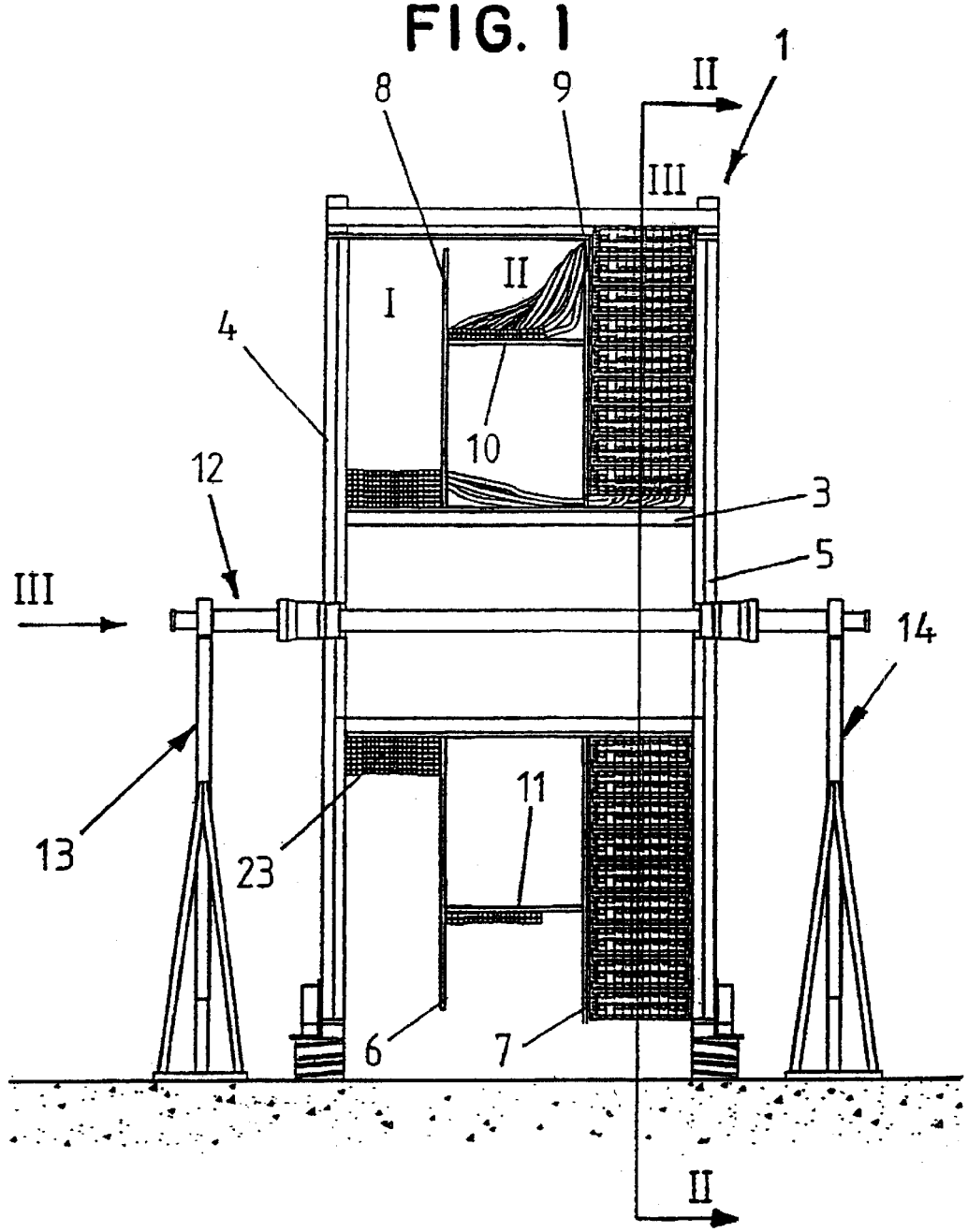
FIG. 1 is a front view of an axial configuration of the transport device according to the invention with a wound energy guiding chain.

The transport device in its entirety is referred to as 1 and the energy guiding chain as 2. Transport device 1 has the form of a very large cable drum with a cylindrical central core 3, which is mounted coaxially to the rotational axis of the transport device and on which energy guiding chain 2 can be at least partially wound up.

Circular end disks 4 and 5 are provided on the front ends of central core 3. In order to divide the space between the end disks into three sections, radial struts 6, 7, 8, 9 are mounted on central core 3 at a distance from the end disks in the longitudinal direction. Connecting rods are mounted between radial struts 6, 7, 8, 9, which also separate and stabilize radial struts 6, 7, 8, 9. In the present case, radial struts 6, 7, 8, 9 and connecting struts 10, 11 are manufactured as steel C-profiles. Connecting struts 10, 11 can be shifted axially along the longitudinal axis of radial struts 6, 7, 8, 9 and can be fixed in any desired position on them. The radial struts can also be mounted on the central core in any desired position in the axial direction.

A shaft, referred to in its entirety as 12, which is connected to end disks 4 and 5 in non-rotating fashion, runs through the central rotational axis of the transport device. The free ends of shaft 12 lie on stands 13 and 14 when at rest. The transport device is located on a fixing device according to the invention, which is referred to in its entirety as 15.

For winding and unwinding, chains or ropes are attached to the free ends of shaft 12 and the entire transport device is lifted by a crane via the chains. During lifting, transport device 1 is lifted off the fixing device, so that transport device 1 can rotate freely. Energy guiding chain 2 is now wound onto the transport device. In order to avoid damaging energy guiding chain 2, it is wound up in a defined manner in the three sections between end disks 4 and 5. The free ends of cables 23 of energy guiding chain 2 are first wound up in the section marked "I". Just before the start of the actual energy guiding chain 2, the cables are diverted through Section II into Section III. The actual links of energy guiding chain 2 are wound up in Section III. Passing the cables from Section I to Section III prevents the cables from kinking suddenly and being damaged.

After the links of energy guiding chain 2 have been wound up on transport device 1, the free cables at the other end of the energy guiding chain are wound onto connecting struts 10, 11 in Section II. Due to connecting struts 10, 11, the cable ends need not be fed right back down to the central core and are wound up in an area of the radial outside edge that is easily accessible.

Figure 3:
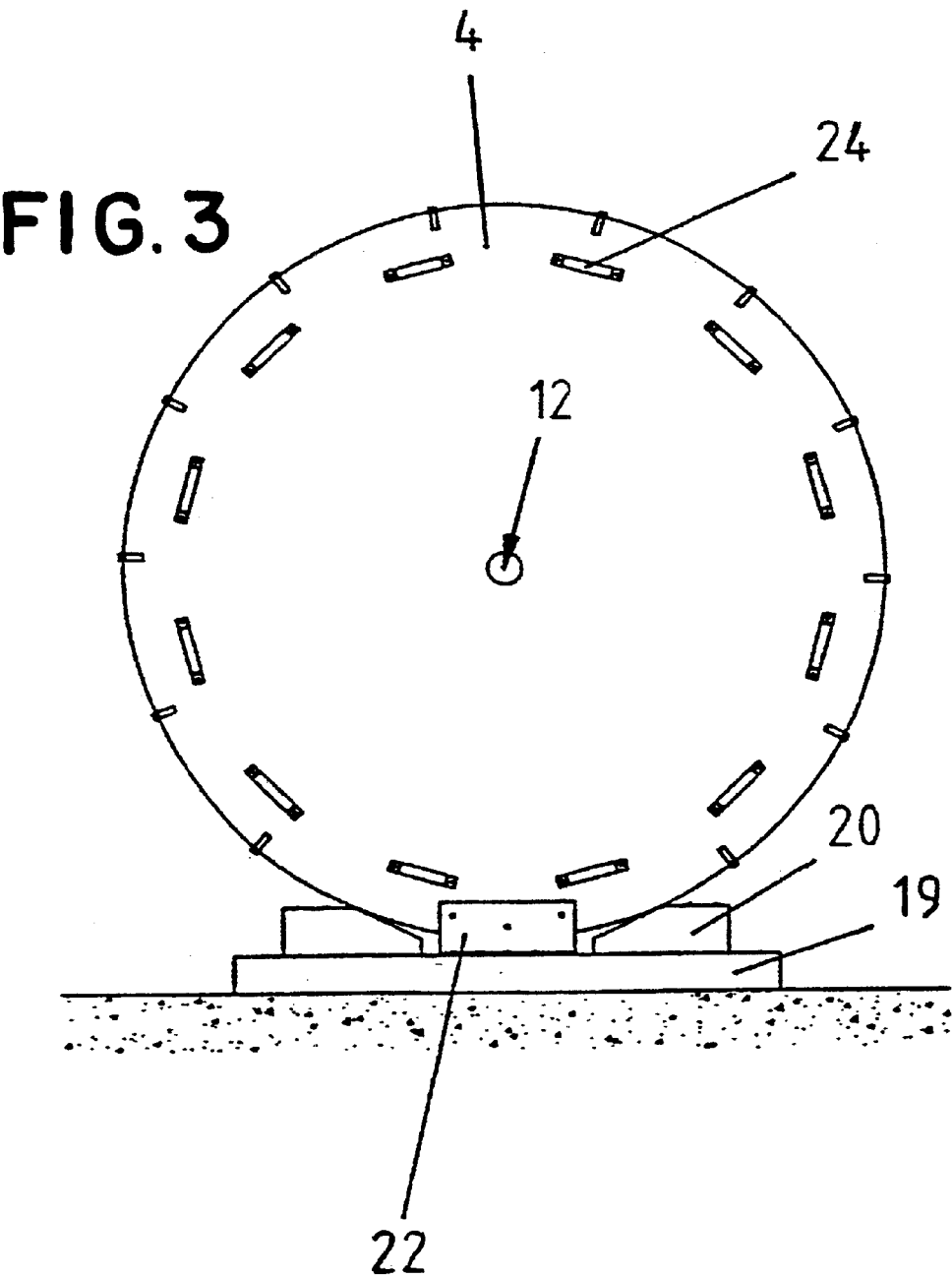
FIG. 3 is a front view along arrow III in FIG. 1 without the stand.

Handles for easier handling are provided on the outside of end disks 4 and 5. These handles can be seen particularly clearly in FIG. 3.

Figure 2:
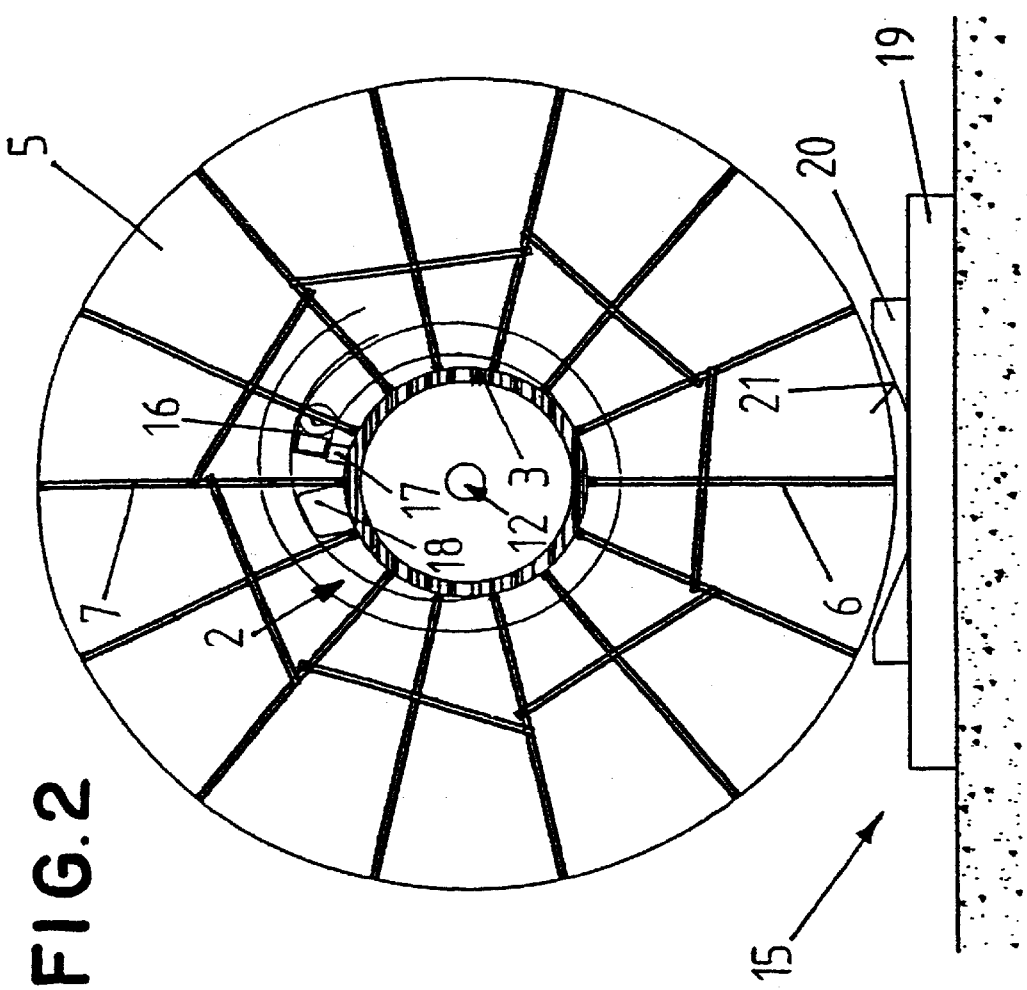
FIG. 2 is a side view along line II—II in FIG. 1.

The exact structure of radial struts 6, 7 can be seen in FIG. 2. FIG. 2 also shows that, in addition to radial struts 6, 7 described, further radial struts are mounted along the entire outside surface of central core 3. Connecting struts 10 and 11, which run parallel to shaft 12, are mounted between each pair of radial struts that are in line with one another in the direction of the view in FIG. 2, in order to ensure adequate stability of transport device 1.

In order to achieve better fixing of end mounting elements 16 of energy guiding chains, a fastening device is provided on central core 3. In the present case, this fastening device consists of a block behind which end mounting device 16 reaches.

Another block 18 is mounted on central core 3 in non-rotating fashion a short distance in front of end mounting element 16 and the fastening device. This block 18 prevents energy guiding chain 2 from kinking during winding and also prevents excessive straining of end mounting element 16 by energy guiding chain 2 as it is wound up.

Fixing device 15 according to the invention, which prevents the rolling or rotation of transport device 1, essentially consists of a base that can be set on a substructure and on which a beam 20 with an arc-shaped recess 21 is mounted. The radius of the arc-shaped recess essentially corresponds to the outside radius of end disk 5. When transport device 1 is set into recess 21 of base 19, fixing device 15 prevents transport device 1 from rotating. Even better fixing is achieved if end disks 5 and 6 are connected to base 19 via a flange 22.

The transport device according to the invention makes it possible for the first time to lay even heavy energy guiding chains in simple fashion. To this end, the transport device is unrolled over a guide trough intended to receive the energy guiding chain.

By lifting the transport device with a crane, the energy guiding chains wound up on the transport device can easily be mounted on a crane jib at relatively great heights. When secured by the flange, fixing device 15 can be lifted by the crane together with the transport device.

Figure 4:
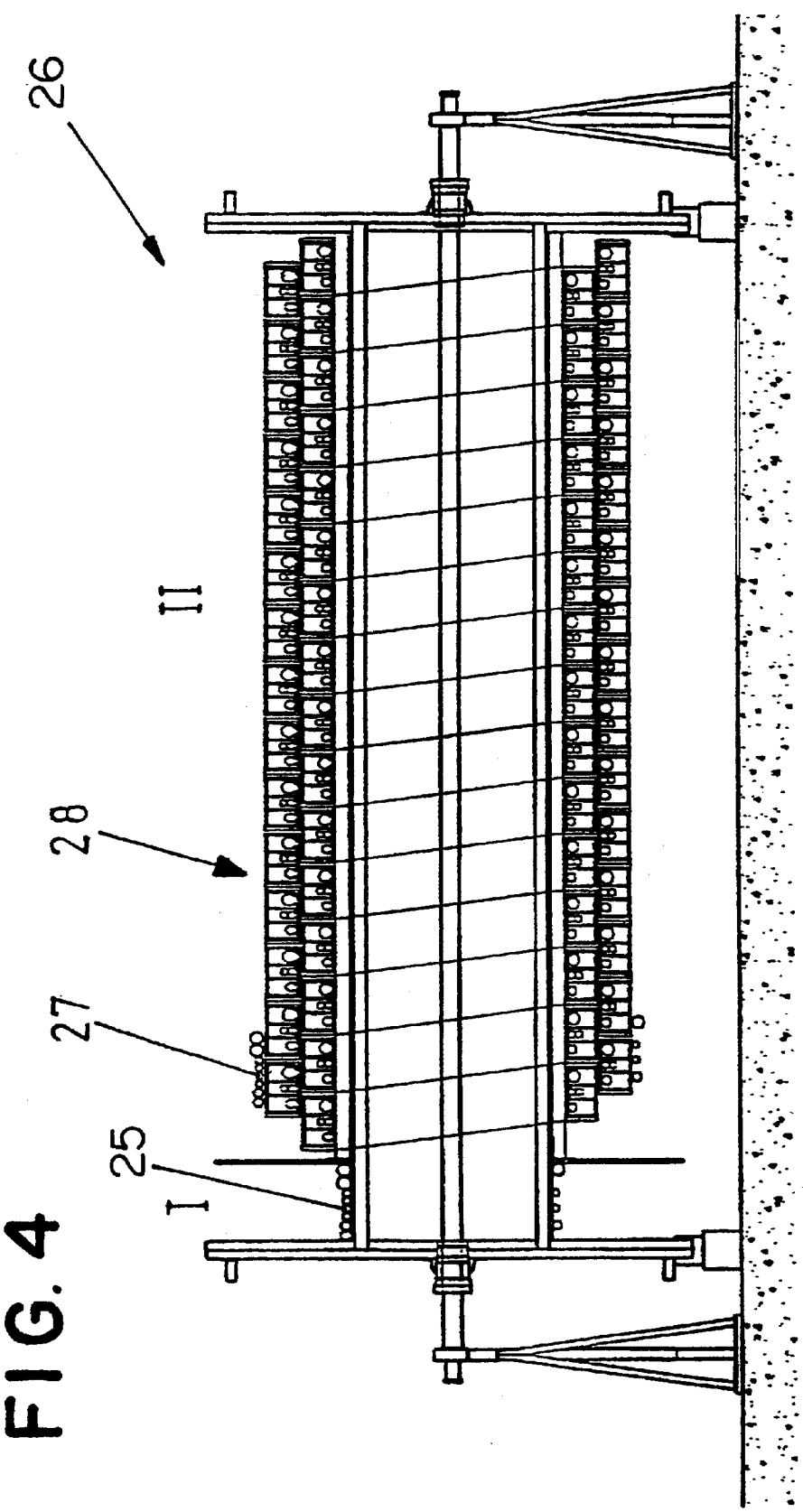
FIG. 4 is an alternative version of the axial configuration of the transport device.

FIG. 4 shows a front view of an axial configuration of the transport device according to the invention. Although this configuration is longer in the axial direction than the one shown in FIG. 1, it has smaller dimensions in the radial direction. The free end of cable 25 is first wound up in Section I of transport device 26. The actual energy guiding chain is wound up on Section II in alternating layers. The end of cables 27 is wound up on the outer layer of energy guiding chain 28.

Figure 5:
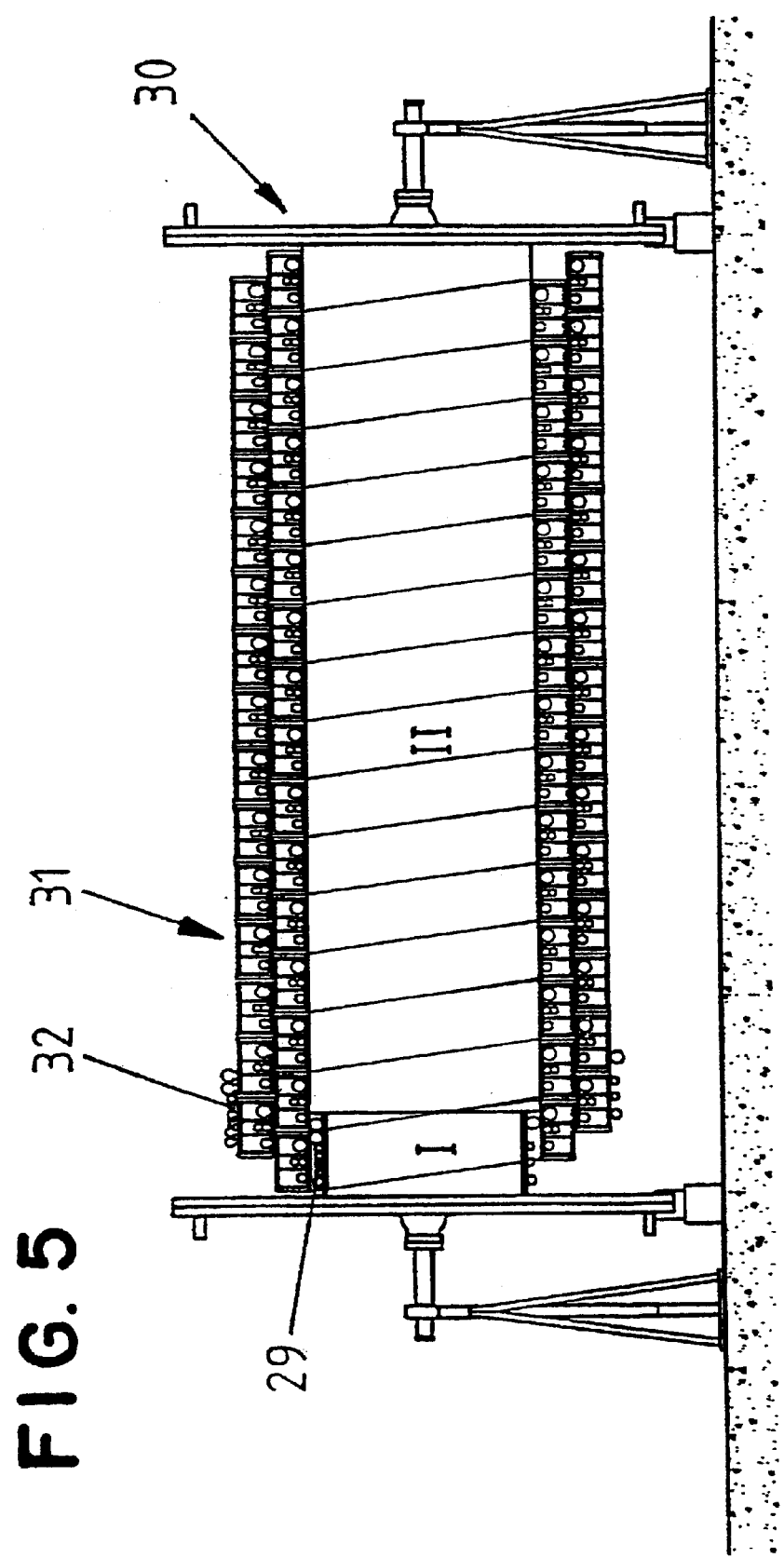
FIG. 5 is a version of the radial configuration of the transport device according to the invention.

Finally, FIG. 5 shows a front view of a radial configuration of the transport device according to the invention. The free end of cables 29 is first wound up on a central core that has a smaller circumference than the main central core. Energy guiding chain 31 is wound up in layers on the main central core that forms Section II. Thus, Section II is separated from the rotational axis of Section I in the radial direction. The end of cables 32 is again wound up on the outer layer of energy guiding chain 31.

Depending on the application, different configurations of the axial and radial transport device can be created. Combinations of the two versions are also feasible.

For transport and storage, the transport device is first lowered onto stands 13, 14. The base of the fixing device according to the invention is then pushed under the edge of end disks 4, 5. In order to lock the transport device, blocks can be placed on the base that fulfill the function of beam 20 with arc-shaped recess. The important aspect in this context is that the fixing device has means to prevent rotation of the transport device. Finally, one or more flanges 22 are mounted between the base and end disks 4, 5. The transport device can now be lifted off stands 13, 14 and completely relocated together with the fixing device. For example, it can be loaded onto a low-bed truck for transport. Stands 13, 14 need not be included in the transport.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A transport device (1, 26, 30) comprising a cable drum wound up with an energy guiding chain (2) fitted with cables and having a cylindrical central core (3) mounted about a rotational axis of the transport device, end elements located on face ends of the central core and extending radially from it, and at least one divider for dividing a space between the end elements into at least one first axial section in which the cables (25, 29) protruding from an end of the energy guiding chain (2) are wound up, and into a second axial section in which the energy guiding chain is wound up, the at least one divider having an axially extending passageway between the at least one first axial section and the second axial section.

2. The transport device (1, 26, 30) as per claim 1, wherein the end elements are designed as circular end disks (4,5).

3. The transport device (1, 26, 30) as per claim 1, wherein the at least one divider comprises radial struts (6, 7, 8, 9) extending radially away from the central core (3), of which at least two are mounted on the central core (3) in line with one another as a pair, and wherein between aligned radial struts (8, 9 and/or 6, 7) connecting struts (10 and/or 11) are mounted, which are essentially parallel to the rotational axis and on which the cables protruding from an end of the energy guiding chain (2) are wound up.

4. The transport device (1) as per claim 3, wherein the space between the end elements is divided into three sections (I, II, III) by the radial struts (6, 7, 8, 9), wherein the cables protruding from an end of the energy guiding chain are rolled up in a section (I) bordering on one end element, the energy guiding chain is wound up in a section (III) bordering on the other end element, the cables running through the intermediate section (II), and the cables protruding from the other end of the energy guiding chain (2) are wound up on the connecting struts (10, 11) mounted between the radial struts (6, 7, 8, 9) in the intermediate section (II).

5. The transport device (26) as per claim 1, wherein the at least one divider for dividing the space between the end elements form two sections (I, II), wherein the cables (25) protruding from one end of the energy guiding chain (2) are wound up in the first section (I), the energy guiding chain (28) is wound up in the other section (II) and wherein the cables (27) protruding from the other end of the energy guiding chain (2) are wound up on the outer layer of the energy guiding chain (28).

6. The transport device (30) as per claim 1, wherein the central core includes a section (I) with a smaller circumference and another section (II) with a larger circumference, wherein the cables protruding from one end of the energy guiding chain are wound up in the section (I) with the smaller circumference, the energy guiding chain (31) is wound up in the section (II) with the bigger circumference, and the cables (32) protruding from the other end of the energy guiding chain are wound up on the outer layer of the energy guiding chain (31).

7. The transport device (1, 26, 30) as per claim 1, wherein a fastening device (17) for an end of the energy guiding chain (2) equipped with an end mounting element (16), is provided on the central core (3) or the end elements.

8. The transport device (1, 26, 30) as per claim 1, further comprising a shaft (12) running coaxially to the rotational axis through the central core (3).

* * * * *

UNITED STATES PATENT AND TRADEMARK OFFICE
CERTIFICATE OF CORRECTION

PATENT NO.   : 6,554,219 B2
DATED        : April 29, 2003
INVENTOR(S)  : Günter Blase It is certified that error appears in the above-identified patent and that said Letters Patent is hereby corrected as shown below:

<u>Title page,</u>
Item [73], Assignee, replace "Igus Spitzgussteille Für die Industrie" with
-- Igus Spritzgussteile Für die Industrie GmbH --.

Signed and Sealed this

Thirtieth Day of September, 2003

JAMES E. ROGAN
*Director of the United States Patent and Trademark Office*